(12) United States Patent  
Kim et al.

(10) Patent No.: US 7,241,536 B2
(45) Date of Patent: Jul. 10, 2007

(54) ELECTROLYTE FOR LITHIUM SECONDARY BATTERY AND LITHIUM SECONDARY BATTERY COMPRISING SAME

(75) Inventors: Jin-Sung Kim, Cheonan (KR); Meen-Seon Paik, Cheonan (KR); Jung-Joon Park, Bucheon (KR); Young-Gyu Kim, Daejeon (KR); Jong-Seob Kim, Daejeon (KR); Hak-Soo Kim, Daejeon (KR); Sang-Jun Lee, Seoul (KR); Jae-Hou Nah, Cheonan (KR); Sang-Moon Hwang, Cheonan (KR); Chan-Jung Kim, Cheonan (KR)

(73) Assignee: Samsung SDI Co., Ltd, Suwon-si (KR)

( * ) Notice: Subject to any disclaimer, the term of this patent is extended or adjusted under 35 U.S.C. 154(b) by 32 days.

(21) Appl. No.: 10/142,380

(22) Filed: May 8, 2002

(65) Prior Publication Data

US 2002/0197537 A1    Dec. 26, 2002

(30) Foreign Application Priority Data

May 11, 2001 (KR) ............... 2001-25763
May 11, 2001 (KR) ............... 2001-25764

(51) Int. Cl.
*H01M 6/16* (2006.01)
(52) U.S. Cl. .................. 429/340; 429/341; 429/330; 429/332; 429/231.1; 429/231.4; 429/231.8
(58) Field of Classification Search .......... 429/340, 429/341, 330, 332, 218, 1, 231.1, 231.4, 429/231.8
See application file for complete search history.

(56) References Cited

U.S. PATENT DOCUMENTS

| | | | |
|---|---|---|---|
| 5,525,443 A | 6/1996 | Okuno et al. | |
| 5,639,575 A | 6/1997 | Omaru et al. | |
| 6,013,394 A | 1/2000 | Gan et al. | |
| 6,146,790 A * | 11/2000 | Omaru et al. | 429/324 |
| 6,180,283 B1 | 1/2001 | Gan et al. | |
| 6,221,534 B1 | 4/2001 | Takeuchi et al. | |
| 6,350,546 B1 * | 2/2002 | Gan et al. | 429/340 |
| 2002/0110735 A1 * | 8/2002 | Farnham et al. | 429/330 |

FOREIGN PATENT DOCUMENTS

| | | | |
|---|---|---|---|
| JP | 2-12779 | * | 1/1990 |
| JP | 3-236169 | | 10/1991 |
| JP | 04-244054 | | 9/1992 |
| JP | 07-176323 | | 7/1995 |
| JP | 07-320779 | | 12/1995 |
| JP | 09-245834 | | 9/1997 |
| JP | 2002-110234 | * | 4/2002 |
| WO | WO99/16144 | | 4/1999 |

OTHER PUBLICATIONS

Sid Megahed, et al., "Lithium-ion Rechargeable Batteries," Journal of Power Sources 51 (1994) 79-104, Elsevier Science S.A.
Shoichiro Mori, et al., "Chemical Properties of Various Organic Electrolytes for Lithium Rechargeable Batteries," Journal of Power Sources 68 (1997) 59-64, Elsevier Science S.A.
Makoto UE, "Solution Chemistry of Organic Electrolytes'" Progress in Battery Materials, 1997, pp. 332-349, vol. 16, Mitsubishi Chemical Corporation, Tsukuba Research Center, Japan.

* cited by examiner

*Primary Examiner*—Laura Weiner
(74) *Attorney, Agent, or Firm*—Christie, Parker & Hale, LLP

(57) ABSTRACT

A non-aqueous electrolyte for a lithium secondary battery is provided. The electrolyte comprises a lithium salt, a non-aqueous solvent, and an organic compound selected from the group consisting of compounds represented by Formulae (1) to (6):

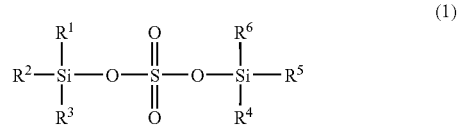

(1)

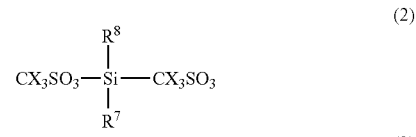

(2)

$R^9-SO_3-Si(C_mH_{2m+1})_3$ (3)

$C_nX_{2n+1}-SO_3-Si(C_mH_{2m+1})_3$ (4)

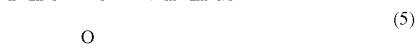

(5)

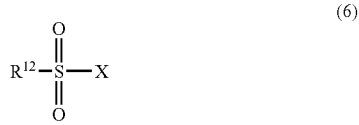

(6)

wherein $R^1$ to $R^{12}$ are each independently selected from the group consisting of primary, secondary, and tertiary alkyl groups, alkenyl groups, and aryl groups; X is hydrogen or halogen; and n and m are numerical values ranging from 0 to 3.

9 Claims, 2 Drawing Sheets

ELECTROLYTE FOR LITHIUM SECONDARY BATTERY AND LITHIUM SECONDARY BATTERY COMPRISING SAME

CROSS REFERENCE TO RELATED APPLICATION

This application is based on and claims priority of Korean patent application Nos. 2001-25763 and 2001-25764 filed in the Korean Industrial Property Office on May 11, 2001, the disclosures of which are incorporated herein by reference in their entireties.

Field of the Invention

The present invention relates to an electrolyte for a lithium secondary battery and to a lithium secondary battery comprising the same, and more particularly, to an electrolyte capable of improving the low temperature characteristics of a lithium secondary battery, and a lithium secondary battery comprising the same.

BACKGROUND OF THE INVENTION

The use of portable electronic instruments is increasing as electronic equipment gets smaller and lighter due to developments in the high-tech electronic industry. Studies on lithium secondary batteries are actively being pursued in accordance with the increased need for a battery having high energy density for use as a power source in these portable electronic instruments. Lithium-containing metal oxides are used as a positive active material of a lithium secondary battery, and lithium metals, lithium-containing alloys, crystalline and amorphous carbons, and carbon-containing composites are used as a negative active material of a lithium secondary battery.

The average discharge voltage of a lithium secondary battery is about 3.6 to 3.7 V, which is higher than other alkali batteries, Ni—MH batteries, Ni—Cd batteries, etc. However, an electrolyte that is electrochemically stable in the charge and discharge voltage range of 0 to 4.2 V is required in order to generate such a high driving voltage. As a result, a mixture of non-aqueous carbonate-based solvents, such as ethylene carbonate, dimethyl carbonate, diethyl carbonate, etc., and a lithium salt, such as $LiPF_6$, $LiBF_4$, or $LiClO_4$, is used as an electrolyte. However, the ion conductivity of such an electrolyte is significantly lower than that of an aqueous electrolyte that is used in a Ni—MH battery or a Ni—Cd battery, thereby resulting in the deterioration of battery cell performance during charge and discharge at a high rate.

Charge and discharge characteristics are affected by ionic conductivity of an electrolyte, and it is preferable that the ionic conductivity is high. Since a large amount of free ions are capable of increasing the ionic conductivity (the ionic conductivity results from a large amount of free ions), the dielectric constant of the electrolyte is high and the viscosity electrolyte of the electrolyte is low. In addition, the electrolyte has a low freezing point, resulting in good movement of the free ions. (Makoto Ue, Solution Chemistry of Organic Electrolytes, *Progress in Battery Materials*, Vol. 16 (1997).)

U.S. Pat. Nos. 5,639,575 and 5,525,443 disclose a solvent having a high dielectric constant mixed with a solvent having a low viscosity in order to enhance electrochemical characteristics of lithium ion batteries, and in particular, a solvent having a low freezing point mixed therewith in order to enhance electrochemical characteristics of lithium ion batteries at low temperatures. However, when a lithium ion battery is discharged at a high rate (1C), its discharge characteristics deteriorate rapidly because the lithium ion mobility is so low at low temperatures, especially at −20° C. Therefore, in order to enhance its discharge characteristics at a high rate, an electrolyte must have high ionic conductivity and low internal resistance when a lithium ion battery is discharged at a high rate.

During the initial charge of a lithium secondary battery, lithium ions, which are released from the lithium-containing metal oxide positive electrode of the battery, are transferred to a carbon negative electrode where the ions are intercalated into the carbon. Because of its high reactivity, lithium is reacted with the carbon negative electrode to produce $Li_2CO_3$, LiO, LiOH, etc., thereby forming a thin film on the surface of the negative electrode. This film is referred to as a solid electrolyte interface (SEI) film. The SEI film formed during the initial charge not only prevents the reaction between lithium ions and the carbon negative electrode or other materials during charging and discharging, but also acts as an ion tunnel, allowing the passage of only lithium ions. The ion tunnel prevents the disintegration of the structure of the carbon negative electrode, which causes organic solvents in an electrolyte with a high molecular weight to make solvate lithium ions, and the solvent and the solvated lithium ions co-intercalate into the carbon negative electrode.

Once the SEI film is formed, lithium ions do not again react with the carbon electrode or other materials such that an amount of lithium ions is maintained. That is, carbon from the negative electrode reacts with an electrolyte during the initial charging, thus forming a passivation layer, such as an SEI film on the surface of the negative electrode, such that the electrolyte solution no longer decomposes and stable charging and discharging are maintained (*J. Power Sources*, 51(1994), 79-104). As a result, in the lithium secondary battery there is no irreversible formation reaction of the passivation layer, and a stable cycle life after the initial charging reaction is maintained.

Since the characteristics of the SEI film are affected by the kind of solvent used for an electrolyte and additives, and they affect ion movement and charge transfer, the battery efficiency may be changed by them, and they are critical for the battery efficiency. (Shoichiro Mori, Chemical Properties of Various Organic Electrolytes for Lithium Rechargeable Batteries, *J. Power Sources*, 68 (1997).)

In order to enhance the characteristics of the SEI film, it has been suggested that additives be added to the electrolyte: For example, Japanese Patent Laid-open No. 95-176323 discloses an electrolyte that has added $CO_2$, and Japanese Patent Laid-open No. 95-320779 discloses an electrolyte with a sulfide-based compound additive in order to prevent the electrolyte from being decomposed.

SUMMARY OF THE INVENTION

It is an object of the present invention to provide an electrolyte for a lithium secondary battery having improved electrochemical characteristics at a low temperature.

It is another object of the present invention to provide a lithium secondary battery having improved electrochemical characteristics at a low temperature.

In order to accomplish these objects, the present invention provides an electrolyte for a lithium secondary battery. The electrolyte includes a lithium salt; a non-aqueous organic"

solvent; and at least one organic compound selected from the group consisting of compounds represented by the following Formulae (1) to (6):

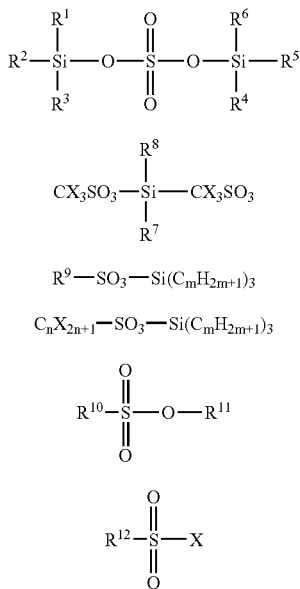

wherein $R^1$ to $R^{12}$ are each independently selected from the group consisting of primary, secondary, and tertiary alkyl groups, alkenyl groups, and aryl groups; X is hydrogen or a halogen atom; and n and m are each numerical values ranging from 0 to 3. It is preferred that $R^1$ to $R^{12}$ are each independently selected from the group consisting of $C_1$ to $C_{11}$ alkyl groups, $C_2$ to $C_{11}$ alkenyl groups, and $C_6$ to $C_{14}$ aryl groups. In the preferred examples of the present invention, $R^1$ to $R^{12}$ are each independently selected from vinyl, benzyl, and phenyl groups.

The present invention further provides a lithium secondary battery including the electrolyte.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
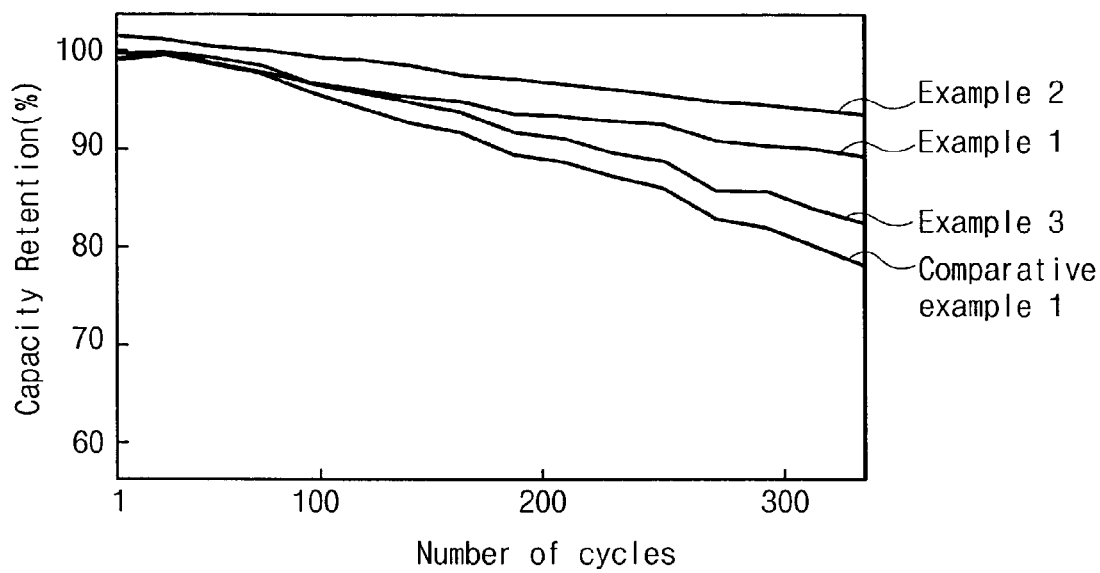
FIG. 1 is a graph illustrating cycle life characteristics of the cells according to Examples 1 to 3 of the present invention and Comparative Example 1.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

An electrolyte of the present invention includes a lithium salt, a non-aqueous organic solvent, and at least one organic compound selected from the group consisting of the compounds represented by Formulae (1) to (6).

The lithium salt that is used for a solute of the electrolyte includes at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein, $_2)(C_yF_{2y+1}SO_2)$ (wherein, x and y are natural numbers.), LiCl, Lil, and mixtures thereof.

The concentration of the lithium salt preferably ranges from 0.7 to 2.0M. When the concentration of the lithium salt is less than 0.7M, the electrolyte performance deteriorates due to its ionic conductivity. When the concentration of the lithium salt is greater than 2.0M, the lithium ion mobility decreases due to an increase of the electrolyte viscosity. The lithium salt acts in a battery as a supply source of lithium ions, making the basic operation of a lithium secondary battery possible.

The non-aqueous organic solvent may include a cyclic carbonate, a chain carbonate, or a mixture thereof. Exemplary cyclic carbonates include ethylene carbonate (EC), propylene carbonate (PC), and butylene carbonate (BC). Exemplary chain carbonates include dimethyl carbonate (DMC), diethyl carbonate (DEC), dipropyl carbonate (DPC), methylpropyl carbonate (MPC), ethylpropyl carbonate (EPC), and methylethyl carbonate (MEC).

In the present invention, the cyclic carbonate and the chain carbonate are preferably mixed together in the volume ratio of 1:1 to 1:9. When the cyclic carbonate and the chain carbonate are mixed in the volume ratio of 1:1 to 1:9, and the mixture is used as an electrolyte, the electrolyte performance may be enhanced.

In addition, the electrolyte of the present invention may further include mixtures of carbonate-based solvents and aromatic hydrocarbon solvents. Exemplary aromatic hydrocarbon solvents include benzene, fluorobenzene, toluene, trifluorotoluene, xylene and mixtures thereof. The carbonate-based solvents and the aromatic hydrocarbon are preferably mixed together in the volume ratio of 1:1 to 10:1. When the carbonate-based solvent(s) and the aromatic hydrocarbon solvent are mixed together in the aforementioned volume ratio and the mixture is used as an electrolyte, the electrolyte performance may be enhanced.

The organic compounds represented by Formulae (1) to (6) are added to the non-aqueous organic solvent in order to prepare the electrolyte of the present invention.

Exemplary organic compounds may include bis(trimethylsilyl) sulfate, di-t-butylsilylbis(trifluoromethane sulfonate), trimethylsilyl methanesulfonate, trimethylsilyl benzenesulfonate, trimethylsilyl trifluoromethanesulfonate, triethylsilyl trifluoromethane sulfonate, methylmethane sulfonate, methyl p-toluene sulfonate, benzenesulfonyl fluoride, and p-toluenesulfonyl fluoride.

The organic compound is added to the non-aqueous organic solvent in an amount of 0.1 to 10 wt %, and preferably in an amount of 0.1 to 5 wt %, based on the total amount of the electrolyte. When the organic compound is used in an amount of less than 0.1 wt %, the electrolyte may not work. When the organic compound is used in an amount of greater than 10 wt %, the cycle life characteristics of the electrolyte may deteriorate.

The organic compound is decomposed earlier than the electrolytic organic solvent during discharge at a high rate at low temperatures to react with lithium ions, resulting in the formation of an SEI film on the negative electrode surface, thereby inhibiting the decomposition of the electrolytic organic solvent. The SEI film helps the lithium ions to intercalate easily on the negative electrode surface, and it decreases the internal resistance. Therefore, the lithium secondary battery is capable of having improved electrochemical characteristics.

Generally, the electrolyte of the present invention is stable at a temperature ranging from −20 to 60° C., thereby maintaining stable characteristics of the battery even at a voltage of 4 V. The electrolyte is applicable to all types of lithium secondary batteries, such as lithium ion batteries and lithium polymer batteries.

A lithium secondary battery of the present invention uses a material that is capable of reversible intercalation/deintercalation of the lithium ions as positive and negative active materials. The positive active material includes a lithium-containing compound, such as a lithium transition metal oxide such as $LiCoO_2$, $LiNiO_2$, $LiMnO_2$, $LiMn_2O_4$, or $LiNi_{1-x-y}Co_xM_yO_2$ (wherein $0 \leq x \leq 1$, $0 \leq y \leq 1$, $0 \leq x+y \leq 1$, and M is a metal such as Al, Sr, Mg, La, etc.); or a lithium chalcogenide that is capable of reversible intercalation/deintercalation of the lithium ions. The negative active material includes amorphous or crystalline carbon, a carbon-containing composite, lithium metal, or a lithium-containing alloy.

A lithium secondary battery is fabricated by preparing the electrode groups by coating the active material to a suitable thickness and length on a collector of a thin plate or coating the active material itself in the form of a film, placing the electrode groups into a can or similar container, and then injecting a non-aqueous electrolyte containing the organic compound into the can or container. Subsequently, the coated material or film is rolled up or laminated along with a porous insulating separator. Resin films, such as polyethylene, polypropylene, etc., can be used as the separator.

The following Examples further illustrate the present invention in detail but are not to be construed to limit the scope thereof.

EXAMPLES AND COMPARATIVE EXAMPLES

Examples 1 to 18

Electrolytes of Examples 1 to 18 were prepared by adding 1 M $LiPF_6$ to a non-aqueous organic solvent comprising ethylene carbonate (EC) and dimethyl carbonate (DMC) mixed in a volume ratio of 1:1, and then adding the organic compounds as shown in Table 1 to the solvent.

TABLE 1

|  | Organic compound | Added Amount (wt %) |
| --- | --- | --- |
| Example 1 | Bis(trimethylsilyl) sulfate | 1 |
| Example 2 | Bis(trimethylsillyl)sulfate | 2 |
| Example 3 | Bis(trimethylsilyl)sulfate | 5 |
| Example 4 | Di-t-butylsilylbis(trifluoromethane sulfonate) | 1 |
| Example 5 | Di-t-butylsilylbis(trifluoromethane sulfonate) | 2 |
| Example 6 | Di-t-butylsilylbis(trifluoromethane sulfonate) | 5 |

TABLE 1-continued

|  | Organic compound | Added Amount (wt %) |
| --- | --- | --- |
| Example 7 | Trimethylsilyl methanesulfonate | 2 |
| Example 8 | Trimethylsilyl benzenesulfonate | 2 |
| Example 9 | Trimethylsilyl trifluoromethanesulfonate | 2 |
| Example 10 | Triethylsilyl trifluoromethanesulfonate | 2 |
| Example 11 | Methylmethanesulfonate | 2 |
| Example 12 | Methylmethanesulfonate | 5 |
| Example 13 | Methyl p-toluenesulfonate | 2 |
| Example 14 | Methyl p-toluenesulfonate | 5 |
| Example 15 | Benzenesulfonyl fluoride | 2 |
| Example 16 | Benzenesulfonyl fluoride | 5 |
| Example 17 | p-toluenesulfonyl fluoride | 2 |
| Example 18 | p-toluenesulfonyl fluoride | 5 |

Comparative Example 1

The electrolyte was prepared in the same manner as in Examples 1 to 18, except that the organic compound was not added to the mixture of the non-aqueous organic solvent and 1M $LiPF_6$.

Measurement of the Decomposition Voltages

Decomposition voltages of the electrolytes according to Examples 2, 5, 7 to 11, 13, 15, and 17, and Comparative Example 1 were measured by a cyclic voltametry. The results are represented in the following Table 2.

TABLE 2

|  | The Decomposition Voltage (V) |
| --- | --- |
| Example 2 | 0.85 |
| Example 5 | 1.05 |
| Example 7 | 0.92 |
| Example 8 | 0.83 |
| Example 9 | 0.75 |
| Example 10 | 0.65 |
| Example 11 | 0.54 |
| Example 13 | 1.05 |
| Example 15 | 0.90 |
| Example 17 | 1.33 |
| Comparative Example 1 | 0.5 |

The conditions for measurement of the decomposition voltages were as follows:

working electrode: mesocarbon fiber (MCF); reference electrode: Li-metal; counter electrode: Li-metal; voltage range: 3 V to 0 V; scan rate: 0.1 mV/s.

The electrolytes of the Examples, to which organic compounds were added, had decomposition voltages higher than that of the electrolyte of Comparative Example 1, to which an organic compound was not added. Accordingly, the electrolytes of the Examples decomposed earlier than the carbonate-based organic solvent during the initial charging, and an SEI film was formed on the negative electrode at the decomposition voltage.

Fabrication of Lithium Ion Cells

After mixing $LiCoO_2$ as a positive active material, polyvinylidenefluoride (PVdF) as a binder, and carbon as a conductive agent in a weight ratio of 92:4:4, a positive slurry was prepared by dispersion of the mixture into N-methyl-2-pyrrolidone (NMP). The slurry was coated on aluminum foil in a thickness of 20 μm, dried, and compressed, thereby manufacturing a positive electrode. After mixing crystalline artificial graphite as a negative active material with PVdF as a binder in a weight ratio of 92:8, a negative slurry was prepared by dispersing the mixture into NMP. The slurry was coated on a copper foil in a thickness of 15 μm, dried, and compressed, thereby manufacturing a negative electrode. Together with a 25 μm thick polyethylene separator, the manufactured electrodes were wound and pressed, then placed into prismatic cans having the dimensions of 30 mm×48 mm×6 mm. Each electrolyte of Examples 1 to 18 and Comparative Example 1 was injected into individual cans, thereby completing the fabrication of the Li-ion cells.

Discharge Capacity Retention Measurement of the Li-ion Cells

The lithium ion cells, which were manufactured by injecting the electrolytes of Examples 1 to 18 and Comparative Example 1, were charged with a current of 160 mA to a charge voltage of 4.2 V under constant current and constant voltage (CC-CV). Then the cells were allowed to sit for 1 hour, and the cells were discharged at 2.5 V with a current of 160 mA and left to sit for 1 additional hour. After repeating this procedure 3 times, the cells were charged with a current of 800 mA to a voltage of 4.2 V for 2 hours and 30 minutes. After charging, the cells were placed in a condenser at −20° C., and they were allowed to stand for 16 hours. Then the cells were discharged with a current of 160 mA to a charge voltage of 2.75V in order to measure the discharge capacity of the cells. The discharge capacity retention of the cells is represented in Table 3.

TABLE 3

|  | Discharge Capacity Retention (%) |
| --- | --- |
| Example 1 | 72.4 |
| Example 2 | 75.5 |
| Example 3 | 70.0 |
| Example 4 | 73.0 |
| Example 5 | 77.3 |
| Example 6 | 75.8 |
| Example 7 | 73.5 |
| Example 8 | 75.9 |
| Example 9 | 74.3 |
| Example 10 | 76.2 |
| Example 11 | 75.4 |
| Example 12 | 71.9 |
| Example 13 | 73.3 |
| Example 14 | 69.8 |
| Example 15 | 71.0 |
| Example 16 | 75.3 |
| Example 17 | 76.8 |
| Example 18 | 73.5 |
| Comparative Example 1 | 69.5 |

The cells were charged with a current of 160 mA to a voltage of 4.2 V under CC-CV, and they were allowed to stand in a condenser at −20° C. for 5 hours. The cells were discharged with a current of 800 mA to a voltage of 2.75V. The discharge capacity retention according to the number of cycles of the cells is represented in Table 4.

TABLE 4

|  | Initial Discharge Voltage (V) | Discharge Capacity Retention (%) |
| --- | --- | --- |
| Example 1 | 3.55 | 24.4 |
| Example 2 | 3.61 | 39.5 |
| Example 3 | 3.41 | 18.2 |
| Example 4 | 3.35 | 10.4 |
| Example 5 | 3.52 | 21.1 |
| Example 6 | 3.55 | 16.6 |
| Example 7 | 3.25 | 3.5 |
| Example 8 | 3.31 | 17.9 |
| Example 9 | 3.25 | 9.2 |
| Example 10 | 3.46 | 21.9 |
| Example 11 | 3.55 | 24.4 |
| Example 12 | 3.35 | 11.9 |
| Example 13 | 3.25 | 18.2 |
| Example 14 | 3.20 | 7.9 |
| Example 15 | 3.52 | 12.4 |
| Example 16 | 3.55 | 17.5 |
| Example 17 | 3.25 | 26.8 |
| Example 18 | 3.31 | 18.9 |
| Comparative Example 1 | 3.11 | 2 |

As shown in Table 4, the cells comprising the electrolytes according to Examples 1 to 18 of the present invention have more improved cycle life characteristics at a low temperature of −20° C. than those of the electrolyte according to Comparative Example 1 of the present invention.

The discharge characteristics of the lithium ion cells of the present invention including the electrolytes comprising the organic compounds increased by 2 to 5% at a low rate (0.2C), and increased by greater than 20% at a high rate (1C).

Figure 2:
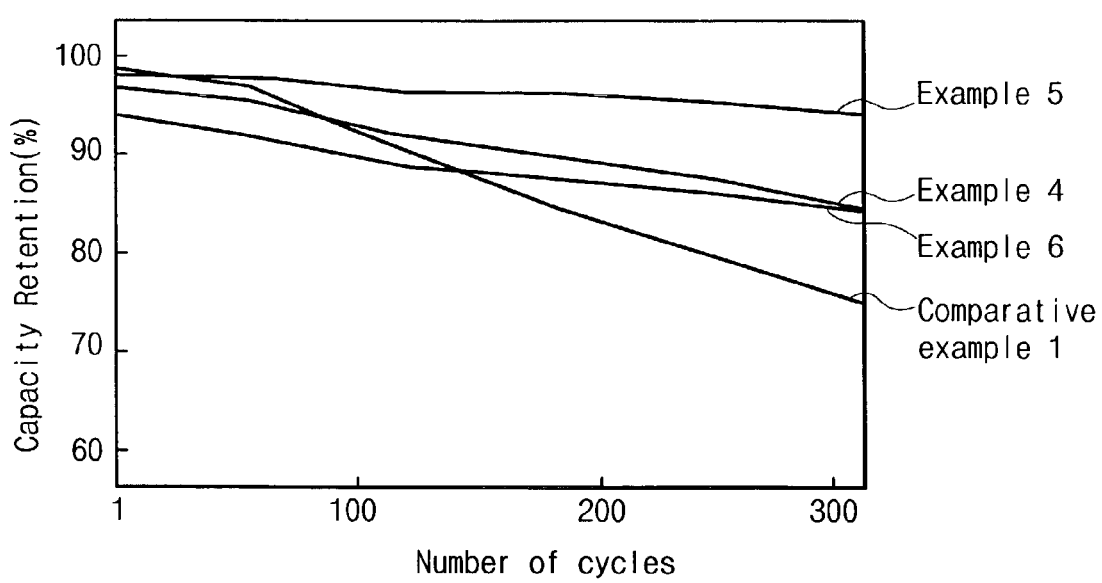
FIG. 2 is a graph illustrating cycle life characteristics of the cells according to Examples 4 to 6 of the present invention and Comparative Example 1.
Figure 3:
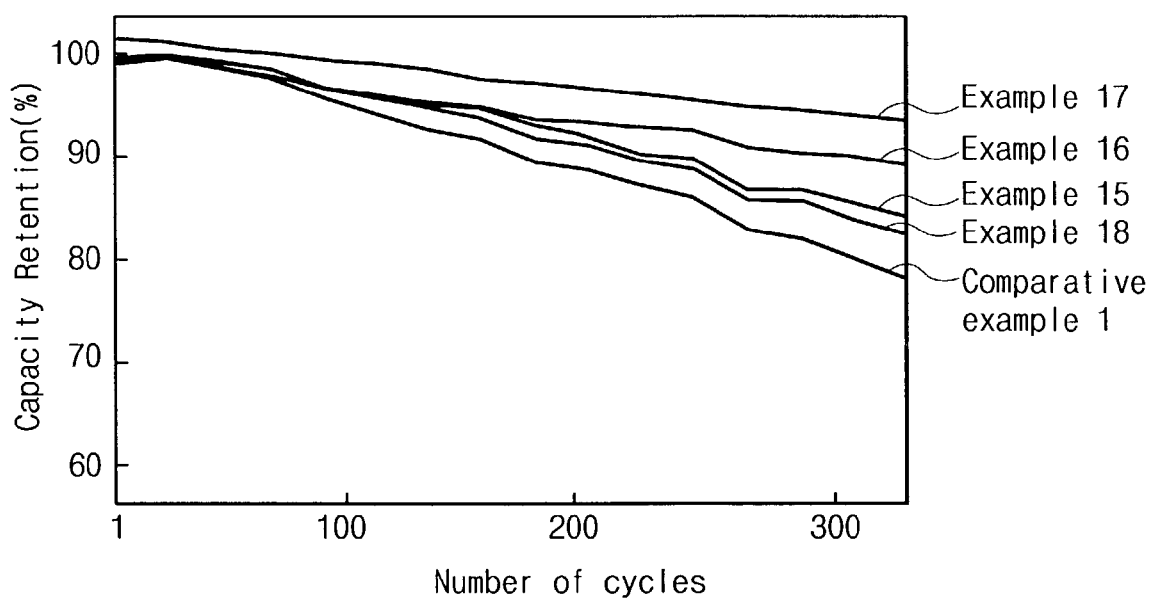
FIG. 3 is a graph illustrating cycle life characteristics of the cells according to Examples 15 to 18 of the present invention and Comparative Example 1.

The cells were charged with a current of 800 mA to a voltage of 4.2V under CC-CV at room temperature. The charged cells were discharged with a current of 800 mA to a voltage of 2.75V. The 300 cycles of charge and discharge of the cells comprising electrolytes according to Examples 1 to 3 were performed, and the cycle life characteristics are represented in FIG. 1. The 300 cycles of charge and discharge of the cells comprising electrolytes according to Examples 4 to 6 were also performed, and the cycle life characteristics are represented in FIG. 2. The 300 cycles of charge and discharge of the cells comprising electrolytes according to Examples 15 to 18 were performed as well, and the cycle life characteristics are represented in FIG. 3. To compare with the cycle life characteristics of cells according to the Examples, the cycle life characteristics of the cell comprising the electrolyte according to Comparative Example 1 is represented in each Figure.

As shown in FIGS. 1 to 3, the cells including the electrolytes comprising the organic compounds of the Examples are superior in cycle life characteristics to the cells comprising the electrolyte of Comparative Example 1.

The organic compounds decompose earlier than the electrolytic organic solvent during discharging at a high rate at low temperatures to react with lithium ions, resulting in the formation of an SEI film on the negative electrode surface, and thereby inhibiting the decomposition of the carbonate-based organic solvent. The SEI film helps the lithium ions to intercalate easily on the electrode surface, and it decreases the internal resistance. Therefore, the lithium ion cell is capable of having improved electrochemical characteristics. The lithium ion cell of the present invention has excellent charge and discharge characteristics, and improved cycle life and discharge characteristics at a high rate at a low temperature.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A lithium secondary battery comprising:
a negative active material comprising carbon;
a positive active material comprising a lithium-containing transition metal oxide; and
an electrolyte comprising:
a lithium salt;
a non-aqueous organic solvent comprising a mixture of an aromatic solvent, a cyclic carbonate, and a chained carbonate, wherein the cyclic carbonate and the chained carbonate are provided in a volume ratio ranging from 1:1 to 1:9, and a volume ratio of the cyclic and chained carbonates to the aromatic solvent ranges from 1:1 to 10:1; and
at least one organic compound selected from a group consisting of the compounds represented by the following Formulae (1) to (6):

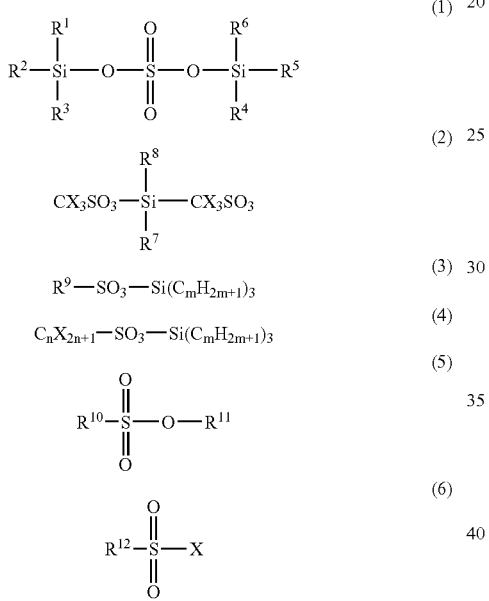

wherein $R^1$ to $R^{12}$ are each independently selected from the group consisting of primary, secondary, and tertiary alkyl groups, alkenyl groups, and aryl groups; X is hydrogen or halogen; and n and m are numerical values ranging from 0 to 3.

2. The lithium secondary battery according to claim 1, wherein the lithium salt is selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ wherein x and y are natural numbers, LiCl, LiI and mixtures thereof.

3. The lithium secondary battery according to claim 2, wherein the concentration of the lithium salt ranges from 0.7 to 2.0M.

4. The lithium secondary battery according to claim 1, wherein the cyclic carbonate is selected from the group consisting of ethylene carbonate (EC), propylene carbonate (PC), butylene carbonate (BC), and mixtures thereof.

5. The lithium secondary battery according to claim 1, wherein the chained carbonate is selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), and mixtures thereof.

6. The lithium secondary battery according to claim 1, wherein the organic compound is present in a weight ratio of 0.1 to 10 wt %.

7. The lithium secondary battery according to claim 6, wherein the organic compound is present in a weight ratio of 0.1 to 5 wt %.

8. The lithium secondary battery according to claim 1, wherein the lithium secondary battery is a lithium ion battery or a lithium polymer battery.

9. A lithium secondary battery comprising:
a negative active material comprising carbon;
a positive active material comprising a lithium-containing transition metal oxide; and
an electrolyte comprising:
a lithium salt;
a non-aqueous organic solvent comprising a mixture of an aromatic solvent, a cyclic carbonate, and a chained carbonate, wherein the cyclic carbonate and the chained carbonate are provided in a volume ratio ranging from 1:1 to 1:9, and a volume ratio of the cyclic and chained carbonates to the aromatic solvent ranges from 1:1 to 10:1; and
at least one organic compound selected from the group consisting of bis(trimethylsilyl) sulfate, di-t-butylsilyl-bis (trifluoromethane sulfonate), trimethylsilyl methanesulfonate, trimethylsilyl benzenesulfonate, trimethylsilyl trifluoromethanesulfonate, triethylsilyl trifluoromethanesulfonate, methylmethane sulfonate, methyl p-toluene sulfonate, benzenesulfonyl fluoride, and p-toluene-sulfonyl fluoride.

* * * * *